March 14, 1967  E. B. SHERRICK  3,308,680
ENGINE CRANKSHAFT AND BALANCING ARRANGEMENT
Filed April 2, 1965  3 Sheets-Sheet 2

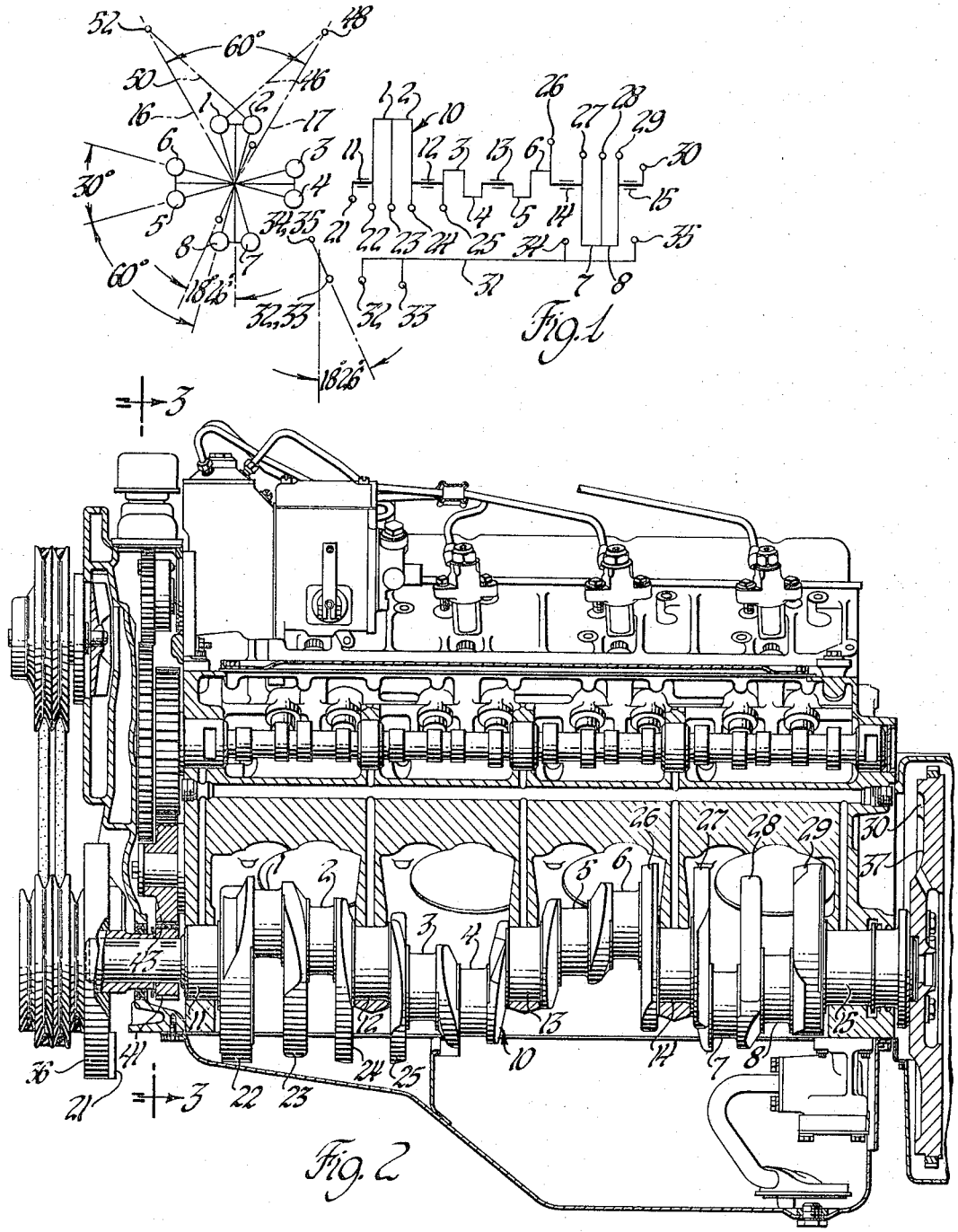

INVENTOR.
Everett B. Sherrick
BY
J. L. Carpenter
ATTORNEY

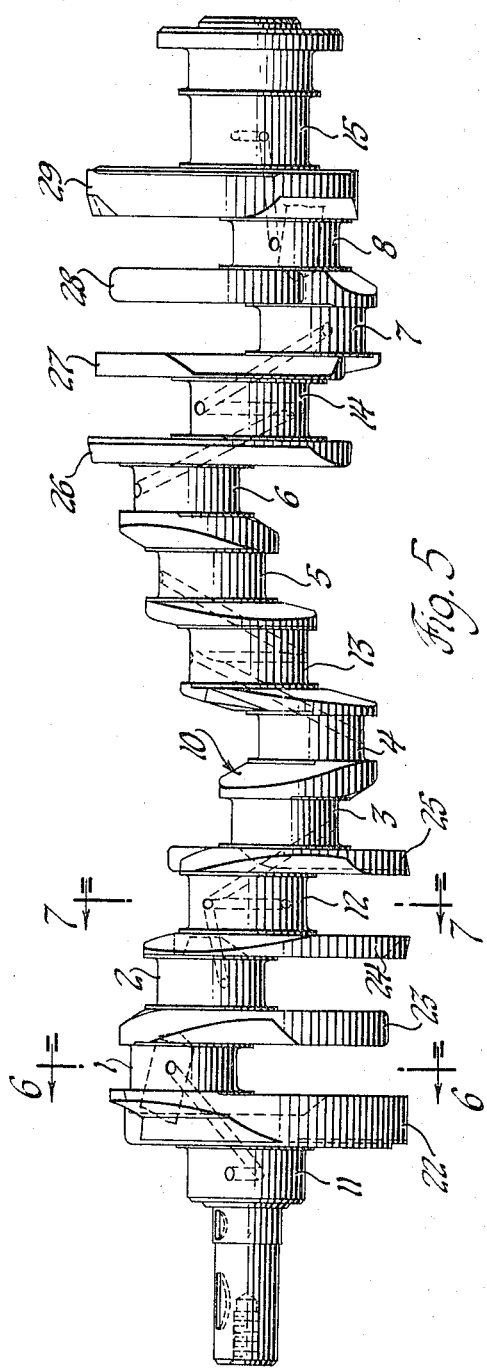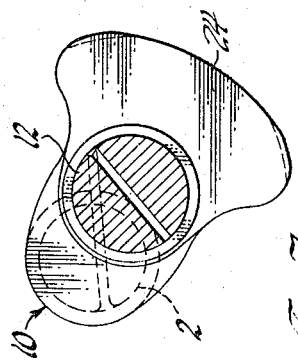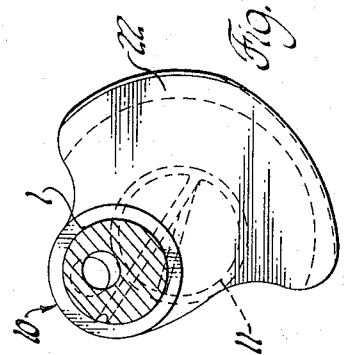

United States Patent Office 3,308,680
Patented Mar. 14, 1967

3,308,680
ENGINE CRANKSHAFT AND BALANCING ARRANGEMENT
Everett B. Sherrick, Orchard Lake, Mich., assignor to General Motors Corporation, Detroit, Mich., a corporation of Delaware
Filed Apr. 2, 1965, Ser. No. 445,028
9 Claims. (Cl. 74—603)

The present invention relates to internal combustion engines and, more particularly, to the crankpin arrangement and balancing means for a V–8 engine with cylinder bank angle of 60°.

Modern automotive internal combustion engines are required to operate at high speed with a minimum of vibration. This requirement renders desirable accurate and complete balancing of the centrifugal and inertia forces and couples set up by rotating and reciprocating masses within the engine.

In order to simplify balancing problems, a 90° bank angle is commonly used in V–8 engines as this results in inherently complete balance of all forces and couples with the exception of centrifugal and primary inertia rotating couples which may be completely balanced by the application of balance weights to the crankshaft. There are, however, occasions when it is desirable to use a bank angle other than that of 90°. For instance, in certain truck applications the engine must be mounted within a relatively narrow compartment and consequently an engine of greater displacement can be accommodated if a bank angle of less than 90° is used in construction of the engine. Furthermore, it is desirable in manufacturing a line of engines having different numbers of cylinders to utilize the same bank angle in all V-type engines of the line in order that the same tooling may be utilized in the manufacture of the complete line of engines. Both of these advantages apply to the engine of the present invention as it was developed as part of a line of V-type engines having a 60° bank angle and intended for a variety of uses, including installations in truck frames where a relatively narrow engine compartment is provided.

Engines may be out of balance with resulting vibration and excessive wear due to either centrifugal or inertia forces or couples. Centrifugal unbalance forces and couples move at engine speed while inertia unbalance forces and couples may be "primary," those operating at engine speed, or may be higher order forces which are classified as "secondary," "tertiary," etc., corresponding to the harmonic of engine speed at which they are effective. The term "unbalance couple" as here applied refers to a pair of oppositely directed equal forces acting perpendicular to the longitudinal axis of the engine and spaced longitudinally a known or determinable distance. These couples may be either "planar" couples which are manifest by forces acting in a single plane lying in the longitudinal axis of the engine or they may be "rotating" couples which change their direction of application with respect to the center line of the engine either at engine speed or at some harmonic thereof.

The design of the present engine eliminates all centrifugal and inertia unbalance forces of primary and secondary order. The unbalance due to inertia forces and couples of higher order than secondary is negligible in the present engine. In addition, secondary couples are completely balanced as a result of the design of the engine. The engine of this specific design has a total resultant unbalance couple comprising a rotating couple which varies in magnitude in an elliptical pattern and may be completely counterbalanced by a combination of weights applied to the crankshaft and to a longitudinally disposed oppositely rotating shaft turning at crankshaft speed.

It is therefore an object of the present invention to produce an 8-cylinder V-type engine of relatively narrow configuration and having a low magnitude of overall unbalance.

It is also an object of the present invention to produce an 8-cylinder V-type engine with a 60° bank angle and low magnitude of overall unbalance.

It is another object of the present invention to provide a 60° V–8 engine in which all centrifugal forces and couples and primary and secondary inertia forces and couples are completely balanced.

It is yet another object of the present invention to provide a 60° V–8 engine with proper balancing means to neutralize all centrifugal and primary inertia unbalance couples.

It is a further object of the present invention to provide a 60° V–8 engine having a crankshaft arrangement by which centrifugal forces, primary and secondary inertia forces and secondary inertia couples are inherently balanced.

It is a still further object of the present invention to provide a 60° V–8 engine having a crankshaft arrangement resulting in a total resultant unbalance couple which may be neutralized by the proper application of balance weights to the engine crankshaft and to a longitudinal balance shaft rotating opposite the direction of crankshaft rotation and at crankshaft speed.

These and other objects of the present invention will be rendered apparent by the following specification and drawings in which:

FIGURE 1 is a schematic view of the crankshaft arrangement and counter-balancing means which are part of the present invention;

FIGURE 2 is a partial sectional view taken generally along the longitudinal axis of an engine embodying the present invention;

FIGURE 5 is a side elevation of the engine crankshaft;

FIGURE 6 is a cross sectional view taken generally along the line 6—6 of FIGURE 5; and FIGURE 7 is a cross sectional view taken generally along the line 7—7 of FIGURE 5.

Figure 3:
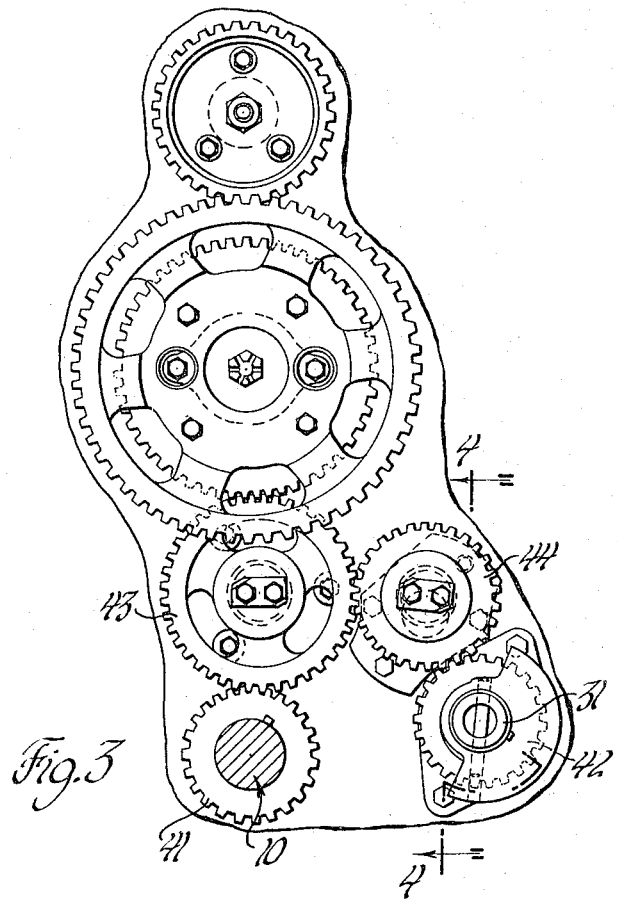
FIGURE 3 is a partial transverse sectional view taken generally along the line 3—3 of FIGURE 2 and showing the front end gear train.

Referring now to the drawings, FIGURE 1 schematically illustrates front and side views of the crankshaft and balancing means. The longitudinal and angular relationships of the crankpins 1, 2, 3, 4, 5, 6, 7 and 8 on the crankshaft 10 are illustrated and it is shown that the crankshaft includes main bearing journals 11, 12, 13, 14 and 15 which separate the crankshaft into four angularly displaced throws each including a pair of crankpins. The crankpins of each throw are angularly displaced 30° from one another. In the figure, the throw containing crankpins 1 and 2 is shown extending in the vertically upward position, while the throw containing crankpins 3 and 4 is phased at an angle of 90° clockwise therefrom as viewed from the front of the engine. The throw containing crankpins 5 and 6 is opposite that of crankpins 3 and 4 and the throw containing crankpins 7 and 8 is phased 90° counterclockwise from that of crankpins 5 and 6 or opposite to that of crankpins 1 and 2.

The engine includes two banks of cylinders forming a 60° angle, the center lines of the cylinders in the right and left banks being indicated by phantom lines 16 and 17 respectively. The odd numbered crankpins of each throw are connected to pistons in the left bank of cylinders while the even numbered crankpins are connected with pistons in the right bank of cylinders so that the angular movement of the crankshaft between the top center positions of pistons connected to the crankpins of the same throw is equal to 90°. This permits the engine to operate with even firing intervals of 90°.

The crankshaft also carries a plurality of counterweights 21, 22, 23, 24, 25, 26, 27, 28, 29 and 30 divided into two groups of five each which are located on opposite ends of the crankshaft. Counterweights 21–25 are carried by the front end of the crankshaft and are directed generally downwardly while counterweights 26–30 are carried by the rear end of the crankshaft and are directed generally upwardly. The centers of gravity of all of the counterweights lie in a plane disposed at an angle of 18° 26' clockwise from the crankthrow comprising the numbers 1 and 2 crankpins.

FIGURE 1 also shows a balance shaft 31 which rotates at crankshaft speed and in the opposite direction thereto. The balance shaft includes a front pair of balance weights 32 and 33 extending generally downwardly and a rear pair of balance weights 34 and 35 extending generally upwardly. With the throw of crankpins 1 and 2 in the vertical position shown, the centers of gravity of the balance shaft weights all lie in a plane disposed at an angle of 18° 26' counterclockwise from vertical. Since the crankshaft and balance shaft rotate oppositely, the planes of the crankshaft counterweights and the balance shaft balance weights will be parallel when passing through both vertical and horizontal positions; however, the location of the weights is such that the balance couples will act in the same direction in the vertical plane and in opposite directions in the horizontal plane.

Referring now to FIGURE 2, the structure of the crankshaft and other parts of the engine is shown in greater detail. The crankshaft 10 includes crankpins 1–8 and main bearing journals 11–15 separating the crankpins into pairs of crankpins carried by individual throws of the crankshaft. Counterweights 22–30 are formed integral with connecting webs of the crankshaft located between the main bearing journals and the individual crankpins. A torsional vibration damper 36 is carried on the front end of the crankshaft and carries counterweight 21 while a flywheel 37 is carried on the rear of the crankshaft and carries counterweight 30.

Figure 4:
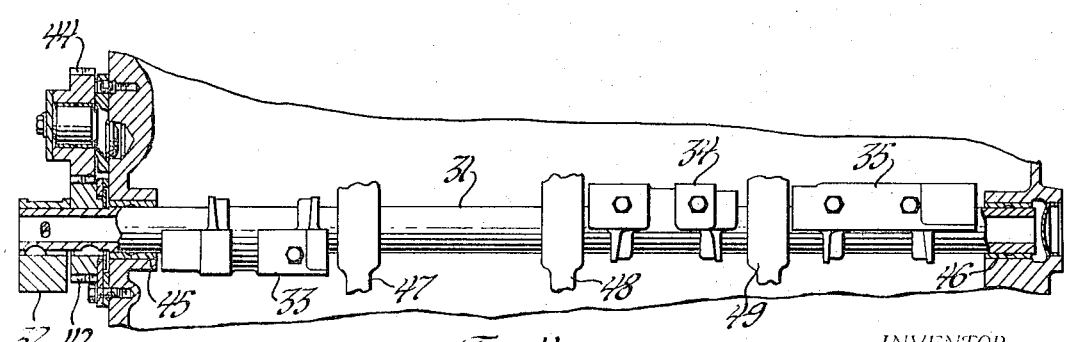
FIGURE 4 is a partial sectional view taken generally along the line 4—4 of FIGURE 3 and showing the balance shaft and its balance weights.

In FIGURES 3 and 4, the balance shaft 31 and the gear train for driving the shaft are shown. Crankshaft 10 carries at its front end a drive gear 41 which drives the balance shaft 31 through a driven gear 42 and a pair of idler gears 43 and 44. Gears 41 and 42 have an equal number of teeth so that the balance shaft is driven at crankshaft speed but in the opposite direction of rotation. The balance shaft is rotatably supported by a pair of outboard bearings 45 and 46 and may also be supported by intermediate bearings in transverse members or webs 47, 48 and 49. The balance shaft includes two pairs of balance weights carried in opposite ends of the engine. The front pair includes balance weight 32, which is carried outboard of the front bearing 45, and balance weight 33, located between bearing 45 and member 47. The rear pair, carried at the opposite end of the shaft, includes balance weight 34 located between webs 48 and 49, and balance weight 35, located between web 49 and the rear bearing 46.

In FIGURES 5, 6 and 7, the crankshaft 10 and its counterweights are shown. It should be noted that the crankthrow carrying the first pair of crankpins 1 and 2 is located between front main journal 11 and intermediate journal 12 and includes counterweights 22, 23 and 24 formed integral with the web portions of the throw. The crankthrow carrying the second pair of crankpins 3 and 4 is located between intermediate journal 12 and the center main journal 13 and includes counterweight 25 formed integral with the web adjacent intermediate main journal 12. The crankthrow carrying crankpins 5 and 6 is located between center main journal 13 and intermediate main journal 14 and includes counterweight 26 which is formed integral with the web adjacent journal 14. The crankthrow carrying crankpins 7 and 8 is located between intermediate main journal 14, the rear main journal 15 and includes counterweights 27, 28 and 29 formed integral with the web portions of the throw. The throws carrying each pair of crankpins are equally spaced longitudinally of the crankshaft so that the distance from the center main journal 13 to the centers of the inner throws is one-third the distance from the center main journal to the centers of the outer throws. This relationship determines the desired angular position of the counterweights with respect to the crankshaft throws, as will be subsequently described.

FIGURES 6 and 7 disclose the particular shapes of counterweights 22 and 24 respectively which are determined by the balance requirements of the engine, the allowable space within the crankcase and between the pins and journals of the engine and the capabilities of manufacturing practices used in forming the crankshaft.

*Method of balancing*

As is well known in the crankshaft balancing art, an internal combustion engine, piston, connecting rod and crankpin assembly sets up centrifugal and inertia forces which must be counteracted to provide smooth operation. Centrifugal unbalance forces are set up by the rotating masses of the crankthrows, including the pins and webs, while inertia unbalance forces are caused by the reciprocating motion of the pistons and the piston pins. The connecting rods create a combination of centrifugal and inertia unbalance forces which can be apportioned by well known methods in order to calculate the total centrifugal and inertia unbalance forces.

In a 60° V–8 engine with a crankshaft as herein illustrated, the centrifugal and primary inertia unbalance forces in the horizontal and vertical directions neutralize one another. The centrifugal and primary inertia unbalance couples, however, add vectorially to form a total resultant unbalance couple which rotates with the crankshaft. The moments caused by the resultant unbalance couple act generally in the directions of eccentricity of the end crankthrows, but are displaced at a fixed angle in the directions of the adjacent center crankthrows. In the present engine, having equal spacing of the crankthrows, the displacement angle is 18° 26' clockwise from the plane of eccentricity of the end crankthrows, as viewed in FIGURE 1.

The resultant unbalance couple is caused by the combined movements of both eccentric rotating masses and reciprocating masses in the engine. The centrifugal unbalance due to the eccentric rotating masses creates a rotating couple of constant magnitude. On the other hand, because of the 60° cylinder bank angle, the primary inertia unbalance due to the reciprocating masses of the engine creates a rotating unbalance couple, commonly called the primary rocking couple. This couple varies in magnitude in an elliptical pattern with the axis of major unbalance bisecting the acute angle between the cylinder banks (in a vertical plane as shown in FIGURE 1) and the axis of minor unbalance lying in a plane perpendicular thereto (in a horizontal plane as shown in FIGURE 1). The rotating and primary rocking couples are additive and, consequently, form an elliptical total resultant unbalance couple having a vertical major axis of unbalance and a horizontal minor axis of unbalance when the cylinder banks are disposed, as shown in FIGURE 1.

As previously noted, there are secondary inertia forces and couples as well as those of higher order involved in the engine balance. These are caused by the motion of the pistons not being a simple harmonic motion. With the particular crankpin arrangement here illustrated, both secondary inertia forces and couples are inherently balanced. The couples and forces at harmonics higher than the second are of such small magnitude as to be negligible.

In order to calculate the magnitude of the total resultant unbalance couple, the centrifugal unbalance and inertia unbalance are considered separately. The amount of centrifugal unbalance may be determined by the well known method of calculating the static moments of the eccentric crankpins and webs of the crankshaft and the rotating portions of the connecting rods.

The maximum unbalance due to inertia forces in the present engine is the vertical component of the primary rocking couple which may be calculated from the relationship $C_{pv} = 3.873Cd$ where $d$ = cylinder center distance, inches
$C = -28.4 \times 10^{-6} W_i RN^2$
$W_i$ = reciprocating weight per cylinder, lbs.
$R$ = crank radius, inches
$N$ = crankshaft speed, r.p.m.

The horizontal component of the primary rocking couple is the minimum value of unbalance and may be calculated from the relationship $C_{pn} = 2.236Cd$. Subtracting the minimum value from the maximum leaves a residual couple of $1.637Cd$ which represents the excess of the vertical component over the horizontal component.

For balancing purposes, the elliptical primary rocking couple can be vectorially resolved into two parts, (1) a primary inertia rotating couple of constant magnitude equal to the minimum unbalance value of $2.236Cd$ and (2) a residual planar couple of varying magnitude acting in the vertical plane and having a maximum value equal to the residual couple value of $1.637Cd$.

The centrifugal rotating couple and the primary inertia rotating couple ($2.236Cd$) may be combined to form a rotating couple of constant magnitude which may be termed the total rotating unbalance couple. This couple acts generally in the direction of the end crankshaft throws but in a plane offset at an angle of 18°26' clockwise from the plane of the end throws as viewed from the front of the engine. The total resultant unbalance couple for the engine is then equal to the vectorial sum of the total rotating unbalance couple and the residual planar couple.

The calculated total rotating unbalance couple for the engine may be completely balanced by adding, to the crankshaft counterweights of sufficient magnitude and so located as to form a counterbalancing couple of equal magnitude acting in the opposite direction. The remaining residual planar couple cannot be balanced by the addition of crankshaft counterweights alone; however, the unbalance may be reduced to the minimum possible in this manner by adding additional counterweighting to increase the value of the counterbalancing couple by one-half the maximum value of the residual planar couple ($.818Cd$). This would give an equal amount of unbalance in both vertical and horizontal planes and would result in a reduced primary unbalance which might be sufficiently small for some applications.

In order, however, to completely balance the residual planar couple, balance weights must be placed on the balance shaft which rotates in the opposite direction from the crankshaft and at crankshaft speed. These balance weights must be of sufficient magnitude and so located as to form a counterbalancing couple equal in magnitude to one-half the maximum value of the residual planar couple ($.818Cd$), and angularly related to the crankshaft counterbalancing couple so as to act parallel thereto in the vertical and horizontal planes, the couples acting in the same direction in the vertical plane and in opposite directions in the horizontal plane.

In this manner, the total resultant unbalance couple is completely balanced since the balance shaft couple adds to the crankshaft counterweight couple in the vertical plane to completely counterbalance the maximum unbalance couple and the balance shaft couple subtracts from the crankshaft counterweight couple in the horizontal plane to provide a resultant couple which exactly counterbalances the minimum unbalance couple.

In their simplest form, the balancing means may comprise as few as two counterweights on the crankshaft and two weights on the balance shaft. If only two weights are used on the crankshaft, they must then be located with their centers of gravities lying the plane of the centrifugal and primary inertia rotating unbalance couples, that is, at an angle of 18°26' clockwise with respect to the plane of eccentricity of the end crankshaft throws. As in the present instance, however, the counterbalancing mass required may be divided among several balance weights on each shaft and these may be apportioned on the shafts in any manner suitable to the structure of the engine so long as the total effect of the plural weights gives the same effective counterbalancing moments.

Thus, in the present invention, a plurality of weights is used on the crankshaft in order to take advantage of available space and avoid increasing the length of the cylinder block. Use of a plurality of counterweights also has the effect of reducing crankshaft bearing loads. A plurality of weights is used on the balance shaft in order that the maximum radius within which the weights rotate may be kept to a minimum so as to reduce the size of the cylinder block and the spacing of the balance shaft from the crankshaft as much as possible.

It is understood that although the invention has been described with reference to a particular embodiment thereof, it is not to be so limited since changes and alterations therein may be made which are within the intended scope of this invention as defined by the appended claims.

What is claimed is:

1. In an eight cylinder V-type four-cycle internal combustion engine having two banks of four cylinders each with an angle of 60° between the banks,
   a crankshaft having eight crankpins arranged sequentially in first, second, third and fourth pairs of adjacent crankpins, the crankpins of each pair being displaced 30° from one another,
   the first and second pairs of crankpins being displaced 90° from one another and 180° from the fourth and third pairs of crankpins respectively,
   one journal provided before said first pair of crankpins and another after said last pair of crankpins and an additional journal intermediate each adjacent pair of crankpins,
   at least two counterweights on said crankshaft so angularly and longitudinally displaced and of sufficient magnitude as to counterbalance both the total rotating unbalance couple of constant magnitude produced on said crankshaft by eccentric rotating and reciprocating masses and one-half the maximum residual planar couple produced on said crankshaft by reciprocating masses, and a second shaft positively driven by said crankshaft at crankshaft speed but in the opposite direction of rotation, said second shaft carrying at least two counterweights so angularly and longitudinally displaced and of sufficient magnitude as to completely balance the remaining portion of the residual planar couple which is not balanced by said crankshaft counterweights.

2. In an eight cylinder V-type four-cycle internal combustion engine having two banks of four cylinders each with an angle of 60° between the banks, a crankshaft having eight crankpins arranged sequentially in first, second, third and fourth pairs of adjacent crankpins, the crankpins of each pair being displaced 30° from one another, the first and second pairs of crankpins being displaced 90° from one another and 180° from the fourth and third pairs of crankpins respectively, at least two counterweights on said crankshaft so angularly and longitudinally displaced and of sufficient magnitude as to counterbalance both the total rotating unbalance couple of constant magnitude produced on said crankshaft by eccentric rotating and reciprocating masses and one-half the maximum residual planar couple produced on said crankshaft by reciprocating masses, and a second shaft positively driven at crankshaft speed but in the opposite direction of rotation, said second shaft carrying at least two counterweights so angularly and longitudinally displaced and of sufficient magnitude as to completely balance the remaining portion of the residual planar couple which is not balanced by said crankshaft counterweights.

3. In an eight cylinder V-type four-cycle internal combustion engine having two banks of four cylinders each with an angle of 60° between the banks, a crankshaft having eight crankpins arranged sequentially in first, second, third and fourth pairs of adjacent crankpins, the crankpins of each pair being displaced 30° from one another, the first and second pairs of crankpins being displaced 90° from one another and 180° from the fourth and third pairs of crankpins respectively, and a second shaft positively driven by said crankshaft at crankshaft speed but in the opposite direction of rotation, said crankshaft and said second shaft each including at least one pair of counterweights so angularly and longitudinally displaced and of sufficient magnitude as to produce a pair of couples rotating in opposite directions at crankshaft speed so as to completely counterbalance the total resultant unbalance couple present in said engine.

4. In an eight cylinder V-type four-cycle internal combustion engine having two banks of four cylinders each with an angle of 60° between the banks, a crankshaft having eight crankpins arranged sequentially in first, second, third and fourth pairs of adjacent crankpins, the crankpins of each pair being displaced 30° from one another, the first and second pairs of crankpins being displaced 90° from one another and 180° from the fourth and third pairs of crankpins respectively, and a second shaft positively driven by said crankshaft at crankshaft speed but in the opposite direction of rotation, said crankshaft and said second shaft each including at least one pair of counterweights so angularly and longitudinally displaced and of sufficient magnitude as to produce a pair of couples of equal magnitude rotating in opposite directions at crankshaft speed so as to counterbalance the residual planar couple present in said engine.

5. In an eight cylinder V-type four-cycle internal combustion engine having two banks of four cylinders each with an angle of 60° between the banks, a crankshaft having eight crankpins arranged sequentially in first, second, third and fourth pairs of adjacent crankpins, the crankpins of each pair being displaced 30° from one another, the first and second pairs of crankpins being displaced 90° from one another and 180° from the fourth and third pairs of crankpins respectively, one journal provided before said first pair of crankpins and another after said last pair of crankpins and an additional journal intermediate each adjacent pair of crankpins, and at least two counterweights on said crankshaft so angularly and longitudinally displaced and of sufficient magnitude as to produce a rotating couple of sufficient magnitude to counterbalance the total rotating unbalance couple of constant magnitude produced on said crankshaft by eccentric rotating and reciprocating masses.

6. In an eight cylinder V-type four-cycle internal combustion engine having two banks of four cylinders each with an angle of 60° between the banks, a crankshaft having eight crankpins arranged sequentially in first, second, third and fourth pairs of adjacent crankpins, the crankpins of each pair being displaced 30° from one another, the first and second pairs of crankpins being displaced 90° from one another and 180° from the fourth and third pairs of crankpins respectively, one journal provided before said first pair of crankpins and another after said last pair of crankpins and an additional journal intermediate each adjacent pair of crankpins, and at least two counterweights on said crankshaft so angularly and longitudinally displaced and of sufficient magnitude as to counterbalance both the total rotating unbalance couple of constant magnitude produced on said crankshaft by eccentric rotating and reciprocating masses and one-half the maximum residual planar couple produced on said crankshaft by reciprocating masses.

7. In an eight cylinder V-type four-cycle internal combustion engine having two banks of four cylinders each with an angle of 60° between the banks, a crankshaft having eight crankpins arranged sequentially in first, second, third and fourth pairs of adjacent crankpins, the crankpins of each pair being displaced 30° from one another, the first and second pairs of crankpins being displaced 90° from one another and 180° from the fourth and third pairs of crankpins respectively, and at least two counterweights on said crankshaft so angularly and longitudinally displaced and of sufficient magnitude as to counterbalance both the total rotating unbalance couple of constant magnitude produced on said crankshaft by eccentric rotating and reciprocating masses and one-half the maximum residual planar couple produced on said crankshaft by reciprocating masses.

8. In an eight cylinder V-type four-cycle internal combustion engine having two banks of four cylinders each with an angle of 60° between the banks, a crankshaft having eight crankpins arranged sequentially in first, second, third and fourth pairs of adjacent crankpins, the crankpins of each pair being displaced 30° from one another, the first and second pairs of crankpins being displaced 90° from one another and 180° from the fourth and third pairs of crankpins respectively, one journal provided before said first pair of crankpins and another after said last pair of crankpins and an additional journal intermediate each adjacent pair of crankpins.

9. In an eight cylinder V-type four-cycle internal combustion engine having two banks of four cylinders each with an angle of 60° between the banks,
- a crankshaft having eight crankpins arranged sequentially in first, second, third and fourth pairs of adjacent crankpins, the crankpins of each pair being displaced 30° from one another,
- the first and second pairs of crankpins being displaced 90° from one another and 180° from the fourth and third pairs of crankpins respectively.

References Cited by the Examiner

UNITED STATES PATENTS

| 1,342,368 | 6/1920 | Woicula | 123—55 |
| 1,665,521 | 4/1928 | Wrentmore | 123—55 |
| 2,304,892 | 12/1942 | Dickson | 74—604 |
| 2,566,476 | 9/1951 | Zuhn | 74—604 |

FOREIGN PATENTS 102,378   3/1917   Great Britain.

FRED C. MATTERN, Jr., *Primary Examiner.*
W. S. RATLIFF, *Assistant Examiner.*